US012563045B1

(12) United States Patent
     Rodriguez

(10) Patent No.:    US 12,563,045 B1
(45) Date of Patent:         Feb. 24, 2026

(54) METHODS AND SYSTEMS FOR MAINTAINING BEHAVIORAL INTEGRITY OF AUTONOMOUS ARTIFICIAL INTELLIGENCE AGENTS

(71) Applicant: Daon Technology, Douglas (IM)

(72) Inventor: Raphael A. Rodriguez, Marco Island, FL (US)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 19/368,783

(22) Filed: Oct. 24, 2025

(51) Int. Cl.
     H04L 9/40          (2022.01)
(52) U.S. Cl.
     CPC ........ H04L 63/102 (2013.01); H04L 63/1483 (2013.01)
(58) Field of Classification Search
     CPC .......................... H04L 63/102; H04L 63/1483
     See application file for complete search history.

(56)                References Cited

U.S. PATENT DOCUMENTS 12,452,035  B1 *  10/2025  Rodriguez ............ H04L 9/3239
   12,483,411  B1 *  11/2025  Chen ...................... H04L 9/3213
  2019/0306315 A1 *  10/2019  Portman ............. H04M 3/5183
  2025/0365323 A1 *  11/2025  Sohum ................... H04L 67/10

* cited by examiner

*Primary Examiner* — Hany S. Gadalla
(74) *Attorney, Agent, or Firm* — Kevin McDermott, Esq.

(57)              ABSTRACT

A method of maintaining behavioral integrity of an artificial intelligence (AI) agent includes capturing AI agent execution signals. The AI agent is bound to a person. Moreover, the method includes calculating similarity scores from the execution signals and an agent similarity score from the similarity scores, verifying runtime attestation of an execution environment hosting the artificial intelligence agent, and calculating an attestation conformity score from the runtime attestation. Furthermore, the method includes calculating an integrity score by combining the similarity and attestation conformity scores and evaluating policy-as-code at one or more policy checkpoints to yield a decision outcome. The policy checkpoints include discover, invoke, and runtime. The method also includes comparing the integrity score against a threshold value. In response to determining the integrity score failed to satisfy the threshold value, or the decision outcome indicates allow with modification, the method includes modifying capabilities of the artificial intelligence agent.

20 Claims, 3 Drawing Sheets

100

10

40

46

48
HASHED CRYPTOGRAPHIC
TEMPLATE

42

50
SEALED PRIVATE KEY

44

METHODS AND SYSTEMS FOR MAINTAINING BEHAVIORAL INTEGRITY OF AUTONOMOUS ARTIFICIAL INTELLIGENCE AGENTS

BACKGROUND OF THE INVENTION

This invention relates generally to artificial intelligence-based digital assistants, and more specifically to methods and systems for maintaining behavioral integrity of autonomous artificial intelligence (AI) agents.

Artificial intelligence powered assistants, also known as agents, and chatbots have been increasingly employed to perform a broad range of digital tasks on behalf of individuals like calendar management, email composition, transaction authorization, and data retrieval. Conventionally, such AI agents are bound to a person's identity via a one-time enrollment procedure, for example, password authentication, physical token validation, or biometric authentication. Once bound, the AI agent typically relies on this static credential binding or, at best, periodic re-authentication to maintain trust.

However, such static and periodic mechanisms are known to be vulnerable to session hijacking, credential compromise, and deepfake attacks that can circumvent one-time or scheduled re-verification checks. Moreover, such systems are typically not updated to account for changes in a person's behavioral characteristics which evolve over time. Such behavioral changes are known as behavioral drift.

Efforts to address behavioral drift in conventional systems typically involve manual retraining workflows or infrequent batch updates. These approaches introduce latency between drift detection and model correction, incur significant administrative overhead, and risk human error in retraining outcomes. Moreover, current governance frameworks often fail to provide fine-grained, tamper-evident audit trails that link each agent action to an authorized human owner, complicating compliance with regulatory requirements and auditor demands.

It is known to continuously bind an AI agent to a person using behavioral patterns for different modalities. However, such bound AI agents have been known to operate autonomously for lengthy periods of time without receiving more recently captured behavioral data that can be used to continuously bind the AI agent to the person. As a result, the AI agent and person are not continuously bound to each other which can weaken detection of a compromised AI agent, exfiltration, tool misuse or policy-bypassing sequences.

Thus, it would be advantageous and an improvement over the relevant technology to provide a method, an electronic device and a computer readable recording medium capable of monitoring intrinsic execution behavior of autonomous AI agents when behavioral biometric modality data of a person is unavailable, to enhance security against spoofing and drift-related errors while preserving a seamless experience for people, thereby enabling deployment of AI agents for important operations with confidence in ongoing identity binding and trustworthiness.

BRIEF DESCRIPTION OF THE INVENTION

An aspect of the present disclosure provides a method of maintaining behavioral integrity of an artificial intelligence (AI) agent that includes capturing AI agent execution signals. The AI agent is bound to a person. Moreover, the method includes calculating similarity scores from the execution signals and an agent similarity score from the similarity scores, verifying runtime attestation of an execution environment hosting the artificial intelligence agent, and calculating an attestation conformity score from the runtime attestation. Furthermore, the method includes calculating an integrity score by combining the similarity and attestation conformity scores and evaluating policy-as-code at one or more policy checkpoints to yield a decision outcome. The policy checkpoints include discover, invoke, and runtime. The method also includes comparing the integrity score against a threshold value. In response to determining the integrity score failed to satisfy the threshold value, or the decision outcome indicates allow with modification, the method includes modifying capabilities of the artificial intelligence agent.

In an embodiment of the present disclosure the agent execution signals include at least one of a tool-invocation graph, inter-call timing statistics, resource-scope descriptors of accessed data or services, and output-plan embeddings.

In another embodiment of the present disclosure calculating the integrity score includes combining the similarity score, the attestation conformity score, and modality specific similarity scores of a Baseline Persona Model of the person. The Baseline Persona Model is a machine learning model that encodes the behavioral modality data of the person over time.

In yet another embodiment of the present disclosure the decision outcome includes allowing the artificial intelligence agent to continue operating in the execution environment, modifying capabilities of the artificial intelligence agent and allowing the artificial intelligence agent to continue operating in the execution environment in accordance with the modifications, or prohibiting the artificial intelligence agent from operating in the execution environment.

In yet another embodiment of the present disclosure the runtime attestation includes at least one of a trusted execution environment quote or measurement, a container image hash, a software bill of materials artifact, and a model-weights hash.

In yet another embodiment of the present disclosure, for each policy checkpoint, the method further includes generating a canonical decision object, wherein the canonical decision object includes at least an agent identification, an identification of the person, authorized capability of the artificial intelligence agent, purpose, data class, the agent similarity score, human-modality similarity scores, the attestation conformity score, the integrity score, threshold values, time-to-live before the AI agent is compromised, time-to-live after determining the AI agent may be compromised, time-to-live after determining the AI agent is compromised, timestamp, and a nonce. The method further includes computing a hash of the canonical decision object, signing the hash within a Hardware Security Module, and writing the signed hash with metadata to an Immutable Ledger.

In yet another embodiment of the present disclosure, the method further includes generating a verifiable audit proof for a time interval. The audit proof includes entries that each include a signed snapshot identifier, hashes of policy decisions, attestation records, time-to-live change events, and identifiers of rollback or sandbox transactions recorded on the immutable ledger.

In yet another embodiment of the present disclosure, the step of modifying capabilities of the artificial intelligence agent includes at least one of substituting a record Persona Snapshot of the person for a Baseline Persona Model associated with the person, reducing a time-to-live for a specific capability of the artificial intelligence agent and replacing a capability-specific credential with a down-scoped, purpose-bound token having capabilities less than the specific capability, and routing actions of the artificial intelligence agent to limit at least one of data accessible by the agent, the scope of write operations of the agent, and transmissions of data by the agent from the electronic device via a network.

In yet another embodiment of the present disclosure, wherein after the routing step, the method includes comparing the integrity score against a threshold value, and when the integrity score satisfies the threshold value, expanding a down-scoped capability and appending a reconciliation entry to the Immutable Ledger.

In yet another embodiment of the present disclosure the similarity scores include a Tool-Invocation Graph similarity score, an Inter-Call Timing similarity score, a Resource-Scope Descriptor similarity score, and an Output-Plan Embedding similarity score, and the step of calculating the agent similarity score includes combining the similarity scores.

Another aspect of the present disclosure provides a non-transitory computer-readable recording medium in an electronic device for maintaining behavioral integrity of an artificial intelligence (AI) agent. The non-transitory computer-readable recording medium stores instructions which when executed by a hardware processor causes the hardware processor to perform the steps of the methods described above.

Yet another aspect of the present disclosure provides an electronic device for maintaining behavioral integrity of an artificial intelligence (AI) agent. The electronic device includes a processor and a memory configured to store data. The electronic device is associated with a network and the memory is in communication with the processor and has instructions stored thereon which, when read and executed by the processor, cause the electronic device to capture artificial intelligence agent-native execution signals. The artificial intelligence agent is bound to a person. Moreover, the instructions which, when read and executed by the processor, cause the electronic device to calculate similarity scores from the execution signals, calculate an agent similarity score from the similarity scores, verify runtime attestation of an execution environment hosting the artificial intelligence agent, and calculate an attestation conformity score from the runtime attestation.

Furthermore, the instructions which, when read and executed by the processor, cause the electronic device to calculate an integrity score by combining the similarity and attestation conformity scores and evaluate policy-as-code at one or more policy checkpoints to generate a decision outcome. The policy checkpoints include discover, invoke, and runtime. Additionally, the instructions which, when read and executed by the processor, cause the electronic device to compare the integrity score against a threshold value. In response to determining the integrity score failed to satisfy the threshold value or the decision outcome indicates allow with modification, the capabilities of the artificial intelligence agent are modified.

In an embodiment of the present disclosure the agent execution signals include at least one of a tool-invocation graph, inter-call timing statistics, resource-scope descriptors of accessed data or services, and output-plan embeddings.

In another embodiment of the present disclosure the instructions when read and executed by the processor, further cause the electronic device to combine the similarity score, the attestation conformity score, and modality specific similarity scores of a Baseline Persona Model of the person to calculate the integrity score. The Baseline Persona Model is a machine learning model that encodes the behavioral modality data of the person over time.

In yet another embodiment of the present disclosure the decision outcome is allow, allow with modifications, or deny. Allow permits the artificial intelligence agent to continue operating in the execution environment. Allow with modification modifies capabilities of the artificial intelligence agent and allows the artificial intelligence agent to continue operating in the execution environment in accordance with the modifications. Deny prohibits the artificial intelligence agent from operating in the execution environment.

In yet another embodiment of the present disclosure the runtime attestation includes at least one of a trusted execution environment quote or measurement, a container image hash, a software bill of materials artifact, and a model-weights hash.

In yet another embodiment of the present disclosure the instructions when read and executed by the processor, further cause the electronic device to generate a canonical decision object. The canonical decision object includes at least an agent identification, an identification of the person, authorized capability of the artificial intelligence agent, purpose, data class, the agent similarity score, human-modality similarity scores, the attestation conformity score, the integrity score, threshold values, time-to-live before the AI agent is compromised, time-to-live after determining the AI agent may be compromised, time-to-live after determining the AI agent is compromised, timestamp, and a nonce. Moreover, the instructions when read and executed by the processor, further cause the electronic device to compute a hash of the canonical decision object, sign the hash within a Hardware Security Module, and write the signed hash with metadata to an Immutable Ledger.

In yet another embodiment of the present disclosure the instructions when read and executed by the processor, further cause the electronic device to generate a verifiable audit proof for a time interval. The audit proof includes entries that each include a signed snapshot identifier, hashes of policy decisions, attestation records, time-to-live lease change events, and identifiers of rollback or sandbox transactions recorded on the immutable ledger.

In yet another embodiment of the present disclosure the instructions when read and executed by the processor, further cause the electronic device to modify capabilities of the artificial intelligence agent by conducting at least one of the following. Substituting a record Persona Snapshot of the person for a Baseline Persona Model associated with the person. Reducing a time-to-live for a specific capability of the artificial intelligence agent and replacing a capability-specific credential with a down-scoped, purpose-bound token having capabilities less than the specific capability. Routing actions of the artificial intelligence agent to limit at least one of data accessible by the agent, the scope of write operations of the agent, and transmissions of data by the agent from the electronic device via a network.

In yet another embodiment of the present disclosure the instructions when read and executed by the processor, further cause the electronic device to compare the integrity score against a threshold value after the actions of the artificial intelligence agent are routed to a sandboxed execution tier, and when the integrity score satisfies the threshold value, expand a down-scoped capability and append a reconciliation entry to the Immutable Ledger.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
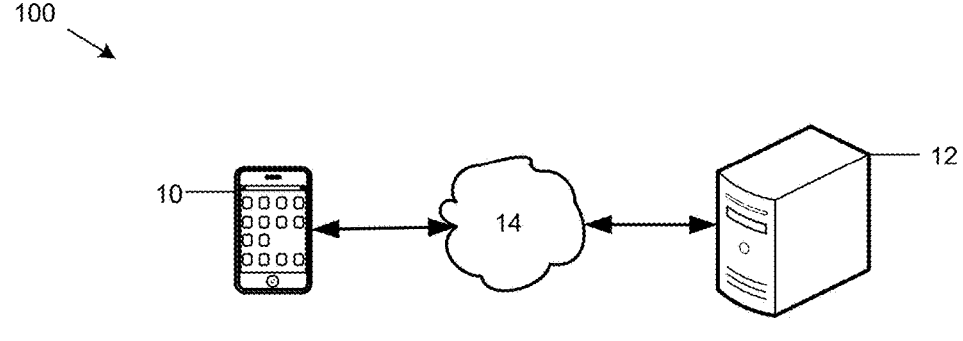
FIG. 1 is a schematic diagram of an example computing system for maintaining behavioral integrity of autonomous artificial intelligence (AI) agents according to an embodiment of the present disclosure.

FIG. 1 is a schematic diagram of an example computing system 100 for maintaining behavioral integrity of autonomous artificial intelligence (AI) agents according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may alternatively be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who typically operates the device.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
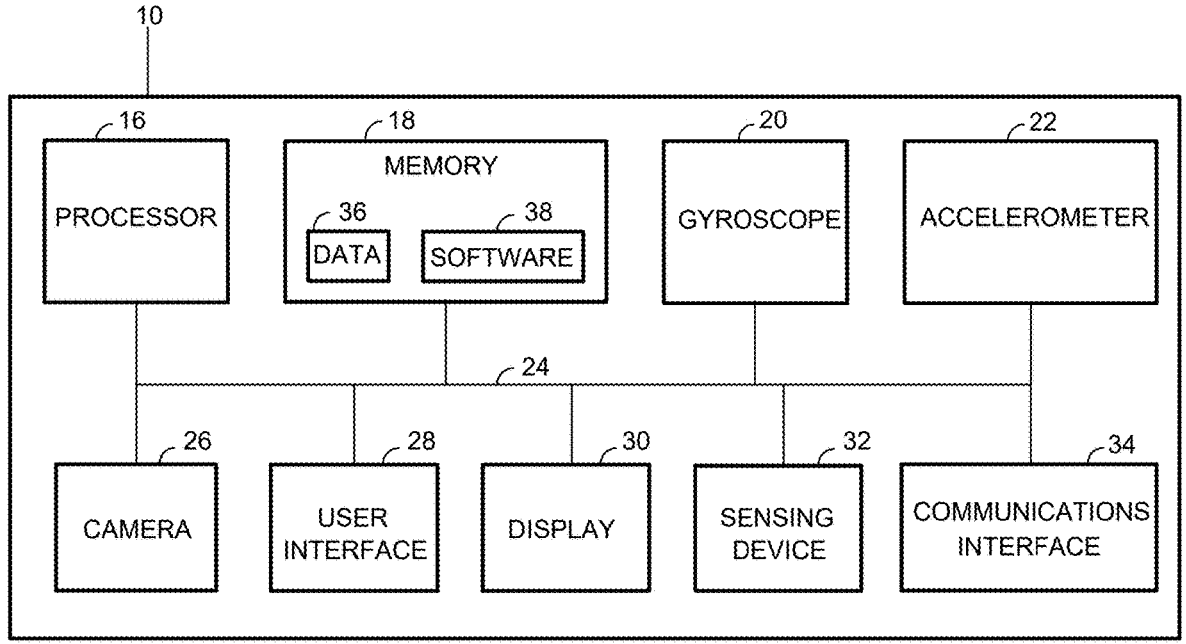
FIG. 2 is a more detailed schematic diagram illustrating an example electronic device in the system of FIG. 1.

FIG. 2 is a more detailed schematic diagram illustrating the example electronic device 10 used for maintaining behavioral integrity of autonomous AI agents according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of people, data regarding an AI Agent's intrinsic execution behavior, execution signals, and data regarding an AI agent behavioral modality. Capabilities, time-to-live for capabilities, similarity scores, threshold values, attestation conformity scores, integrity scores, policy check points, policies, decision outcomes, credentials, tokens, agent similarity scores, agent similarity threshold values, and agent similarity threshold values, Trusted execution environment quotes or measurements, container image hashes, software bills of materials (SBOM), and a model-weights hash. Data stored in the memory 18 may be referred to as record data. For example, an agent similarity score stored in the memory 18 may be referred to as a record agent similarity score.

Each data record is typically for a respective person. The data record for each person may include data such as, but not limited to, the name of the person, historical behavioral patterns of the person, preferences of the person, risk thresholds, raw behavioral modality data of the person collected over time, and templates representing the captured behavioral modality data of the person. Templates representing different behavioral modalities of a person may be referred to as record behavioral modality data of the person.

Data regarding an AI Agent's intrinsic execution behavior includes, but is not limited to, tool-invocation structure, call cadence, or resource access patterns. Data regarding the behavioral modality of an AI agent may include, but is not limited to, tool-invocation graphs, inter-call timing or burstiness statistics, resource scope descriptors, and output-plan embeddings. The behavioral modality of an AI agent can be used to construct a record AI agent similarity score which may also be stored in the memory 18.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein.

Application programs are software and include, but are not limited to, operating systems, Internet browser applications, enrolment applications, machine learning algorithms (MLA), Hidden Markov Models (HMM), Baseline Persona Models, attestation verifiers, Hardware Security Modules (HSM), sandbox software programs, policy evaluation software, rate-limit software programs, and any special computer program that manages the relationship between application software and any suitable variety of hardware that helps to make-up a computer system or computing environment. The software may also include computer programs that implement buffers and use RAM to store temporary data.

Machine learning models have parameters which are modified during training to optimize functionality of the models trained using a machine learning algorithm (MLA). Baseline Persona Models as described herein are machine learning models (MLMs) that encode the behavioral patterns or behavioral modality data of a person over time. Baseline Persona Models may be continuously retrained. Behavioral patterns or data used to retrain the Baseline Persona Model may be approved by the person before being used to retrain the Baseline Persona Model.

Baseline Persona Models can be implemented, for example, as Gaussian mixture models (GMM), Hidden Markov Models (HMM) for mouse movements, and as the centroid of language-style embeddings generated by Bidirectional encoder Representations from Transformers (BERT) models. Data associated with Baseline Persona Models includes, but is not limited to, HMM transition matrices, embedding centroids and associated thresholds. Thus, it should be understood that the Baseline Persona Model is a continuously-trained machine learning model capturing multi-modal behavioral parameters, for example, GMM, HMM, and embedding centroids.

A copy of the all the parameters of the Baseline Persona Model of a person taken at an instantaneous point-in-time may be referred to herein as a snapshot. A snapshot effectively freezes the Baseline Persona Model at a point in time and is obtained when the Baseline Persona Model is in an uncorrupted state. The snapshot can be used to facilitate resetting the Baseline Persona Model when the Baseline Persona Model changes beyond acceptable threshold values. Snapshots may be, for example, fifty keystroke timings or a short voice embedding. Snapshots typically are not stored in the memory 18. Rather, snapshots can be cryptographically hashed and assigned metadata.

Metadata includes, but is not limited to, timestamps and version numbers. The hash values are signed within a Hardware Security Module (HSM) (not shown) and written to a permissioned Immutable Ledger (not shown) to ensure tamper-evident lineage. An Immutable Ledger as described herein can be a tamper-evident data store or a permissioned blockchain, into which cryptographic hashes of snapshots, enrollment events, and policy updates are recorded. Additionally, or alternatively, the Immutable Ledger may be implemented using a distributed ledger based on Directed Acyclic Graph (DAG) structures, or a replicated, tamper-evident distributed database. Each ledger node may be operated by distinct organizational entities, for example, a compliance auditor or a security operations center to enhance trust.

If the Immutable Ledger is temporarily inaccessible due to, for example, network 14 operational issues the electronic device 10 may use a local caching mechanism to maintain operational continuity. Each electronic device in the system 100 may maintain a secure, encrypted cache of the most recent snapshot and its associated cryptographic hash, stored within a trusted execution environment (TEE). Upon detecting ledger inaccessibility, the cached snapshot may be retrieved for use. Once ledger connectivity is restored, any snapshot hashes or metadata writes generated during the inaccessibility period can be synchronized. Integrity is verified by recomputing and comparing hashes against the cached values. If the cache is also unavailable, for example, due to device compromise, manual re-authentication is performed.

Captured behavioral modality data may be compared against the Baseline Persona Model of a person in any manner. For example, cosine similarity may be used to compare captured behavioral modality data of a person against the Baseline Persona Model of the person across all modalities.

An attestation verifier may calculate a conformity score indicating whether observed measurements match expected values. Example measurements include, but are not limited to, a trusted execution environment (TEE) quote or measurement, a container image hash, a software bill of materials (SBOM) reference, and a model-weights hash. The measurements may be referred to as attestation measurements. The conformity score may be integrated into a fused integrity score and may independently trigger rollback, cause the time-to-live (TTL) to be reduced, reduce the scope of a capability, or sandbox routing upon failure. Rollback as described herein may refer to the process of restoring capabilities of an AI agent after the capabilities of the AI agent were modified due to unacceptable drift.

Capability as described herein is a named group of actions that may be undertaken by an AI agent. Capabilities include, for example, initiating a payment up to a certain amount for a specific vendor, reading calendar metadata without event bodies, writing files into a designated folder without authority to delete files, and executing a parameterized read only query against a whitelisted schema. Calendar metadata may include, for example, titles and time ranges. Each capability is implemented via a capability-specific credential that authorizes the capability or a closely related set of actions with limits. An example limit is the time-to-live (TTL) associated with the capability.

The TTL sets a certain period of time for a capability to be executed by the AI agent. The TTL binds a capability to time parameters, for example, a time the AI agent is permitted to execute the capability and a time the permission to execute the capability expires. For example, the AI agent may be permitted to execute the capability of initiating payments between 6:00 AM and 6:00 PM every day. When the TTL expires, the AI agent 46 is no longer permitted to execute the capability. Permission expires automatically.

Down-scoping as described herein includes narrowing the scope of a capability. An example of down-scoping could be changing the individuals to whom an AI agent may send emails, for example, changing from being able to send emails to anyone to being able to send emails to a single email address. Alternatively, the ability to send emails may be changed from sending to anyone to draft only.

A purpose-bound token as described herein is a credential switched with a capability that encodes a reduced scope and shortened TTL for the capability.

Sandbox software programs enforce reduced capabilities of AI Agents. Sandbox software may facilitate reducing the capabilities of the AI agent by, for example, eliminating one or more capabilities and limiting the scope of a capability. Limiting the scope of a capability may include, for example, limiting write effects.

The reduced capabilities imposed on an AI agent by sandbox techniques may be removed when an agent similarity score equals or exceeds an agent similarity threshold value for consecutive intervals of time, or when an integrity score equals or exceeds a threshold value for intervals of time. The intervals of time may be of any duration, for example, five minutes, that facilitates determining an AI agent is not compromised and can be trusted. The number of intervals may be any number that facilitates accurately determining that an AI agent is not compromised, for example, three.

Policy-as-code is the use of code to represent policy where the policies are rules and conditions for access policies that determine when access is authorized. Policy evaluating software evaluates policy-as-code at discover, invocation and run time checkpoints. Checkpoints may be points in software where codified policies are enforced to validate infrastructure or code against standards. The standards may be established by, for example, a government or business.

Rate-limit software programs can monitor inter-call bursts and determine if the number of inter-call bursts exceeds a burst threshold value. If so, the remaining time-of-life (TTL)

may be reduced for an AI agent to conduct a capability. Additionally, when the number of inter-call bursts exceeds the burst threshold value the capabilities of the AI agent may be reduced via sandbox software programs. When the number of inter-call bursts repeatedly exceeds the burst threshold value, the person bound to the AI agent may need to reauthenticate or reauthenticate to a more rigorous standard.

An authentication data requirement is the biometric modality data desired to be captured during a verification or identification transaction. For the example methods described herein, the authentication data requirement may be face, finger, or any behavioral modality like keystroke dynamics.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either. The gyroscope 20 and accelerometers 22 may capture data for behavioral modalities such as, but not limited to, the gait of a person, swinging arms of a person, and other motion related activities.

The camera 26 captures image data. As used herein, capture means to record data temporarily or permanently, for example, multimedia data. The camera 26 can be one or more imaging devices configured to record images of identity documents of a user while utilizing the electronic device 10. Moreover, the camera 26 is capable of recording images under any lighting conditions including infrared light. The camera 26 may be integrated into the electronic device 10 as one or more front-facing cameras and/or one or more rear facing cameras that each incorporates a sensor, for example and without limitation, a CCD or CMOS sensor. Alternatively, the camera 26 can be external to the electronic device 10. The camera 26 may capture videos of a person moving.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers. The devices included in the interface 28 may collect multi-modal behavioral data that includes, for example, keystroke dynamic data, language-style embeddings, and voice-print feature data. A similarity score may be computed from the collected multi-modal behavioral data and compared against the Baseline Persona Model for the person.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed or information entered by a person can be captured and stored in the memory 18. The interface 28 may include adapters for chat platforms, web widgets, and mobile applications. Examples of chat platforms include, but are not limited to, Slack and Teams.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like, only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet.™. or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across the network 14 between the electronic device 10 and any other device (not shown). The exchange of information may involve the transmission of radio frequency (RF) signals through an antenna (not shown).

The server 12 includes most of the same components as described herein with regard to the electronic device 10. However, because the server 12 is primarily stationary, not primarily mobile, the server 12 may not include the gyroscope 20 and/or the accelerometer 22.

Figure 3:
FIG. 3 is a simplified block diagram illustrating a bond between a person and an AI agent.
Figure 3:
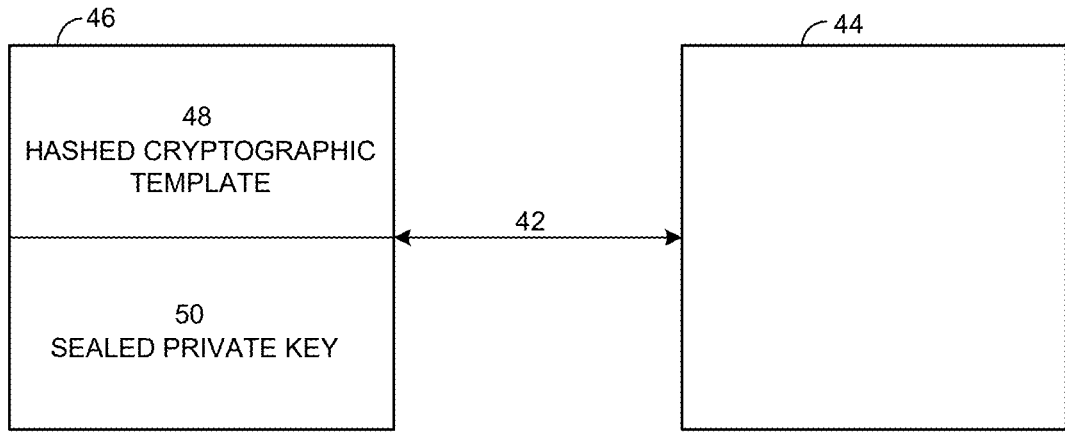

FIG. 3 is a simplified block diagram 40 illustrating a bond 42 between a person 44 that operates, for example, the electronic device 10 and an artificial intelligence (AI) agent 46. The AI agent 46 includes a hashed cryptographic template 48 and a sealed private key 50. The hashed cryptographic template 48 may be created during an enrollment process as the result of conducting an authentication transaction with, for example, biometric modality data captured from the person. The biometric modalities may include, for example, finger, voice and face. After the person is successfully authenticated, a biometric template is created from the captured biometric modality data. The template is hashed to form the hashed cryptographic template 48. The hashed cryptographic template 48 may be stored in a trusted execution environment (TEE) in, for example, the processor 16 or may be stored in a Hardware Security Module (HSM) able to communicate with the electronic device 10 via the network 14.

Public/Private key cryptography may be used to create the bond 42 between the person 44 and the AI agent 46. More specifically, a public/private key pair can be created and the private key 50 can be stored, for example, within the TEE or in the HSM. The private key 50 is unlocked and able to be accessed when biometric data captured from an individual operating the electronic device 10 is successfully authenticated against the hashed cryptographic template 48. A successful authentication indicates that the individual operating the electronic device 10 is the person 44. The bond 42 is thus created between the person 44 and the AI agent 46. The person 44 is the human owner to whom the AI agent 46 is bound.

The public key, the hashed cryptographic template 48, and associated metadata are written to an Immutable Ledger to create an auditable record that the AI agent 46 is bound to the person 44. It is contemplated by the present disclosure that by virtue of binding the AI agent 46 to the person 44, the person 44 possesses exclusive rights over the credentials and models associated with the AI agent 46. The credentials can include, for example, the hashed cryptographic template 48 and the sealed private key 50. The models can include, for example, the Baseline Persona Model and the snapshot. As described herein, sealed indicates that the private key 50 cannot be removed from the TEE, or the HSM, in encrypted form and can be unlocked upon a successful authentication transaction. Thus, the sealed private key 50 is a HSM/TEE protected key bound to the hashed cryptographic template 48.

It is contemplated by the present disclosure that the public/private key pair may be periodically replaced with a different public/private key pair. When the public/private key pair is replaced, the bond between the person 44 and the AI agent 46 is re-established as described herein with regard to FIG. 3.

Although the hashed cryptographic template 48 is created from biometric modality data as described herein, it is contemplated by the present disclosure that the hashed cryptographic template 48 may alternatively be created from any other type of security credential, for example, a pass phrase or a physical token.

The AI agent 46 does not include raw authentication data, for example, captured biometric modality data or pass phrases.

It is contemplated by the present disclosure that the AI agent 46 thus bonded to the person 44 is authorized to represent and execute behavioral data, preferences and actions of the person 44 on behalf of the person 44. However, the private key 50 is to be unlocked before the AI agent 46 is permitted to conduct any transaction on behalf of the person 44. The private key 50 is unlocked and able to be accessed when biometric data captured from an individual operating the electronic device 10 is successfully authenticated against the hashed cryptographic template 48. A successful authentication indicates that the individual operating the electronic device 10 is the person 44.

After the AI agent 46 is bound to the person 44, the AI agent 46 may execute capabilities on behalf of the person 44, for example, initiating payment up to a certain amount for a specific vendor.

Behavior of the AI agent 46 may be characterized using telemetry including, for example, tool-invocation graphs, inter-call timing statistics, resource-scope descriptors of accessed data and/or services, and output-plan embeddings generated by the AI agent 46. The AI agent 46 telemetry is independent of human biometric inputs or telemetry of the electronic device 10 and any devices communicating with the electronic device 10. As a result, the AI agent 46 may be referred to herein as an AI agent-native. The tool-invocation graphs, inter-call timing statistics, resource-scope descriptors of accessed data and/or services, and output-plan embeddings may alternatively be referred to herein as signals that may be used to calculate an AI agent similarity score and may be evaluated at policy checkpoints.

A record AI agent similarity score may be created based on previously captured telemetry of the AI agent 46 using, for example, sequence modelling techniques. Sequence modelling techniques may be implemented using, for example, Recurrent Neural Networks (RNN). The record AI agent similarity baseline may be stored in, for example, the memory 18.

Using tool-invocation graphs may involve embedding a tool-invocation graph with node2vec using random walks of length, walks per node, return parameter, in-out parameter, window size, and embedding dimensions. For example, the random walks may have a length of 80, the walks per node may be 10, the return parameter may be 10, the in-out parameter may be 0.5, the window size may be 10, and the embedding dimension may be 64. A session-level vector may be the mean of visited node embeddings, a baseline centroid and covariance may be estimated from at least one thousand authorized sessions using the AI agent 46.

Inter-call intervals are summarized using exponentially weighted moving averages (EWMA) as a function of the weight ($\lambda$) given to a most recent rational subgroup mean. EWMA weights samples in geometrically decreasing order so that the most recent samples are weighted most highly while the most distant samples contribute very little. The weight ($\lambda$) may be, for example, 0.2 and a baseline may be estimated from a rolling window of, for example, at least one thousand samples.

Resource-scope descriptors are mapped to a fixed m-dimensional binary incidence vector. Similarity uses Jaccard.

Output-plan embeddings are predicted outputs, for example, files and side-effects that are encoded by a frozen text encoder with a dimension d. The dimension d may be, for example, 384. An agent score is a monotone aggregation.

Artificial intelligence powered assistants, also known as agents, and chatbots have been increasingly employed to perform a broad range of digital tasks on behalf of individuals like calendar management, email composition, transaction authorization, and data retrieval. Conventionally, such AI agents are bound to a person's identity via a one-time enrollment procedure, for example, password authentication, physical token validation, or biometric authentication. Once bound, the AI agent typically relies on this static credential binding or, at best, periodic re-authentication to maintain trust.

However, such static and periodic mechanisms are known to be vulnerable to session hijacking, credential compromise, and deepfake attacks that can circumvent one-time or scheduled re-verification checks. Moreover, such systems are typically not updated to account for changes in a person's behavioral characteristics which evolve over time. Such behavioral changes are known as behavioral drift.

Efforts to address behavioral drift in conventional systems typically involve manual retraining workflows or infrequent batch updates. These approaches introduce latency between drift detection and model correction, incur significant administrative overhead, and risk human error in retraining outcomes. Moreover, current governance frameworks often fail to provide fine-grained, tamper-evident audit trails that link each agent action to an authorized human owner, complicating compliance with regulatory requirements and auditor demands.

It is known to continuously bind an AI agent to a person using behavioral patterns for different modalities. However, such bound AI agents have been known to operate autonomously for lengthy periods of time without receiving more recently captured behavioral data that can be used to continuously bind the AI agent to the person. As a result, the AI agent and person are not continuously bound to each other which can weaken detection of a compromised AI agent, exfiltration, tool misuse or policy-bypassing sequences.

To address these problems the electronic device 10 can capture AI agent execution signals, where the AI agent is bound to a person. Similarity scores can be calculated from the execution signals and an agent similarity score can be calculated from the similarity scores. The electronic device 10 can verify the runtime attestation of an execution environment hosting the AI intelligence agent, calculate an attestation conformity score from the runtime attestation, and calculate an integrity score by combining the similarity and attestation conformity scores. The electronic device 10 can also evaluate policy-as-code at one or more policy checkpoints to yield a decision outcome, where the policy checkpoints include discover, invoke, and runtime. The integrity score can be compared against a threshold value and in response to determining the integrity score failed to satisfy the threshold value, or the decision outcome indicates allow with modification, the electronic device 10 can modify capabilities of the AI agent.

Figure 4:
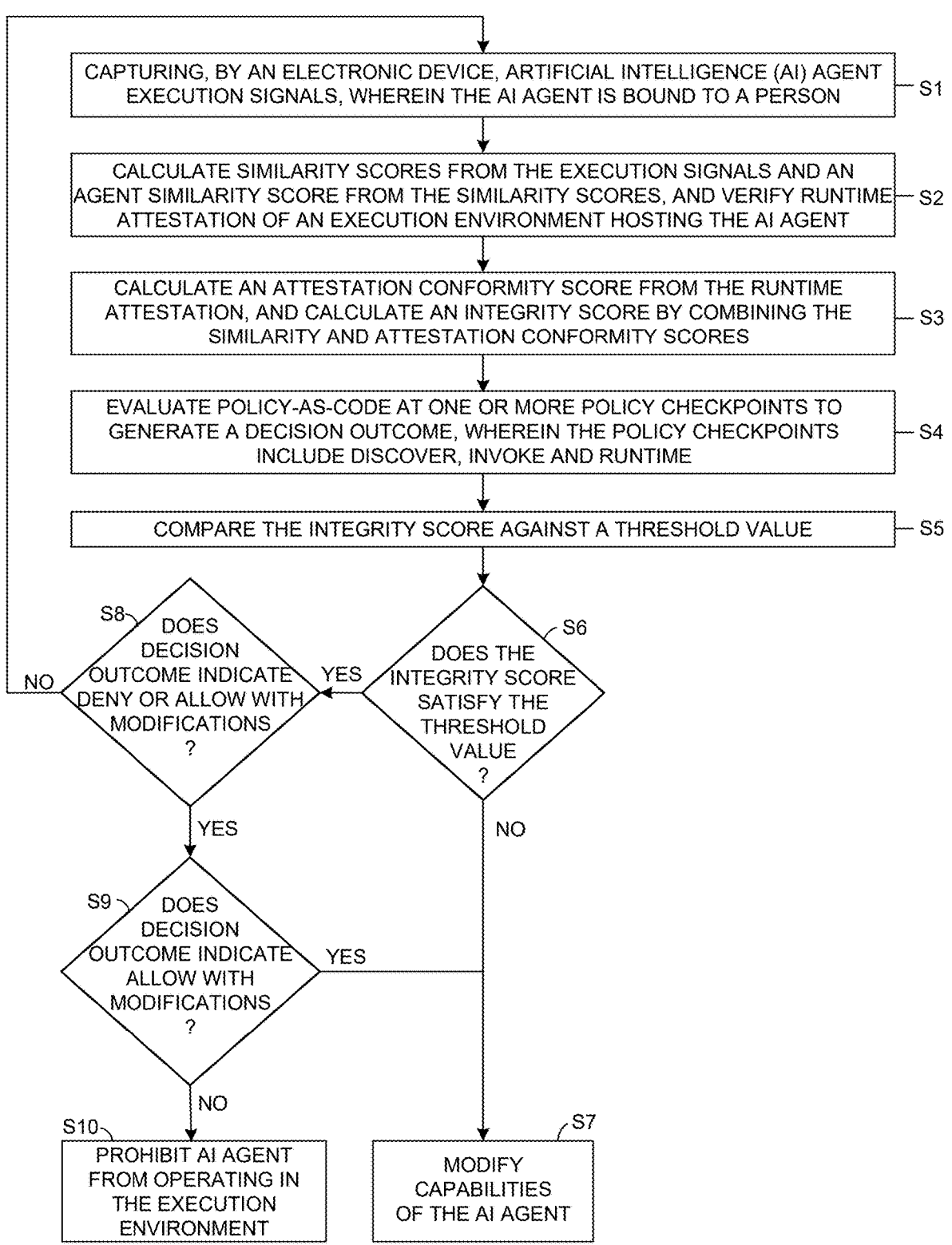
FIG. 4 is a diagram illustrating an example method and algorithm for maintaining behavioral integrity of an autonomous AI agent according to an embodiment of the present disclosure.

FIG. 4 is a diagram illustrating an example method and algorithm for maintaining behavioral integrity of an autonomous artificial intelligence (AI) agent according to an embodiment of the present disclosure. FIG. 4 illustrates example steps performed when the electronic device 10 runs software 38 stored in the memory 18 to maintain behavioral integrity of an autonomous artificial intelligence (AI) agent.

In step S1, the software 38 executed by the processor 16 causes the electronic device 10 to capture execution signals generated by an AI agent, for example, the AI agent 46. The AI agent operates within an execution environment of the electronic device 10, is bound to a person, and generates the execution signals while executing capabilities on behalf of the person 44.

Capability as described herein is a named group of actions that may be undertaken by an AI agent. Capabilities include, for example, initiating a payment up to a certain amount for a specific vendor, reading calendar metadata without event bodies, writing files into a designated folder without authority to delete files, and executing a parameterized read only query against a whitelisted schema. Calendar metadata may include, for example, titles and time ranges. Each capability is implemented via a capability-specific credential that authorizes the capability or a closely related set of actions with limits. An example limit is the time-to-live (TTL) associated with the capability.

The TTL sets a certain period of time for a capability to be executed by the AI agent. The TTL binds a capability to time parameters, for example, a time the AI agent is permitted to execute the capability and a time the permission to execute the capability expires. For example, the AI agent may be permitted to execute the capability of initiating payments between 6:00 AM and 6:00 PM every day. When the TTL expires, the AI agent is no longer permitted to execute the capability. Permission expires automatically. The TTL is not an inherent property of the capability itself.

Rather, the TTL is policy type control over the capability. The TTL associated with a credential can be adjusted before it expires.

In step S2, the software 38 executed by the processor 16 causes the electronic device 10 to calculate similarity scores from the execution signals, calculate an agent similarity score from the similarity scores, and verify runtime attestation of the execution environment hosting the AI agent.

The similarity scores can include, for example, a Tool-Invocation Graph (TIG) similarity score, an Inter-Call Timing (ICT) similarity score, a Resource-Scope Descriptor (RSD) similarity score, and an Output-Plan Embedding (OPE) similarity score. The Tool-Invocation Graph (TIG) similarity score may be generated, for example, by creating a graph from the execution signals and comparing the cosine similarity of the graph against a record cosine similarity of a TIG baseline graph. The Inter-Call Timing (ICT) similarity score may be generated by converting timing drift, measured with an exponentially weighted moving average, into a confidence score. The confidence score can, for example, vary between zero and one. The Resource-Scope Descriptor (RSD) similarity score may be generated, for example, by using a set-overlap measure like Jaccard, between resources accessed by the AI agent and a record scope. A resource can be, for example, data or a service that the agent can read, write invoke or modify. The Output-Plan Embedding (OPE) similarity score may be generated by using a vector-embedding comparison, for example, a cosine comparison between a current plan and a record baseline plan. The current plan can be, for example, a plan generated by the agent for the captured signals during a current session and the baseline plan can be, for example, a recorded plan pattern learned from signals captured during previous sessions for the same person and capability.

The agent similarity score may be calculated, for example, by combining the TIG, ICT, RSD, and OPE similarity scores. Each of the scores may be assigned a same or different weight in the calculation. If one of the example similarity scores cannot be calculated, for example, because the captured execution signals are unavailable or are of poor quality, the similarity score may be omitted from the calculation or may be assigned a low weight.

The agent similarity score may be calculated periodically to smooth transient spikes. The agent similarity score summarizes how closely current agent behavior comports with the agent similarity threshold value.

In step S3, the software 38 executed by the processor 16 causes the electronic device 10 to calculate an attestation conformity score from the runtime attestations and an integrity score by combining the similarity and attestation conformity scores.

The execution environment in which the AI agent operates generates artifacts including, for example, a trusted execution environment (TEE) quote or measurement, a container hash image, a software bill of materials (SBOM), and model hash weights. The electronic device 10 verifies the runtime attestation of the execution environment hosting the AI agent by verifying, for example, the TEE quote, the container hash image, the SBOM, and the model hash weights and calculates an attestation conformity score indicating whether the artifacts comport with expected values. The TEE quotes may be validated against an allow list of platform keys. TEE quotes older than, for example, ten minutes may be rejected. The container hash images may be compared against a transparency registry with inclusion proofs. The SBOM content may be compared against a policy of acceptable deltas. A delta can be, for example, any change between two SBOMs. The model hash weights may be compared against a model registry. Thus, the electronic device 10 can calculate the attestation conformity score, for example, based on the results of the TEE quote verification, the container hash image verification, the SBOM verification, and the model hash weights verification.

The similarity and attestation conformity scores may be combined in any manner to calculate the integrity score. For example, the similarity and attestation conformity scores may be combined according to the equation $S=\alpha A+\gamma R$, where S is the integrity score, A is the agent similarity score, R is the attestation conformity score, $\alpha$ and $\gamma$ are weighted coefficients, $\alpha$, $\gamma \in [0,1]$, and $\alpha+\gamma=1$.

The similarity and attestation conformity scores may also be combined with a human-behavior modality score to calculate the integrity score. Thus, the integrity score may alternatively be computed by taking the behavior of the bounded person into account. For example, the integrity score may alternatively be calculated according to the equation $S=\alpha A+\beta H+\gamma R$, where S is the integrity score, A is the agent similarity score, H is a combined human-behavior modality score, R is the attestation conformity score, $\alpha$, $\beta$, and $\gamma$ are weighted coefficients, $\alpha,\beta$, $\gamma \in [0,1]$, and $\alpha+\beta+\gamma=1$.

Next, in step S4, the software 38 executed by the processor 16 causes the electronic device 10 to evaluate policy-as-code, or machine readable rules, at one or more policy checkpoints to generate a decision outcome. The policy checkpoints may include, for example, discover, invoke, and runtime. At each of the checkpoints, a canonical Javascript Object Notation (JSON) is generated that includes, for example, an identification of the AI agent, an identification of the person to whom the AI agent is bound, capabilities of the AI agent, the purpose of the AI agent, data class, the AI agent similarity score, the attestation conformity score, the integrity score, threshold values, TTL before the AI agent is compromised, TTL after determining the AI agent may be compromised, TTL after determining the AI agent is compromised, a decision outcome, a policy version, a timestamp, and a nonce. The nonce prevents replay and the timestamp is taken from a monotonic clock synchronized to the time of the Immutable Ledger. The JSON may be a cryptographic hash signed within the HSM and written with metadata to the Immutable Ledger to link a snapshot state, decisions and actions for auditor verification.

The electronic device 10 generates, based on the JSON, a decision outcome of deny, allow with modifications, or allow. Deny indicates that the AI agent is prohibited from operating within the execution environment. Allow with modifications indicates that the capabilities of the AI agent are to be modified and that the AI agent may continue operating in the execution environment in accordance with the modifications.

The modifications may include substituting the Persona Snapshot of the person for the Baseline Persona Model of the person, reducing the TTL of a named capability and switching a capability-specific credential with a down-scoped purpose-bound token, and limiting capabilities of the AI agent. Examples of limiting the capabilities of the AI agent include, but are not limited to, reducing the sensitivity of data the AI agent is permitted to access, reducing the write-effect scope of the AI agent, and reducing the data allowed to be transmitted by the agent from the electronic device 10 via the network 14. Down-scoping as described herein includes narrowing the scope of a capability. An example of down-scoping could be changing the individuals to whom emails may be sent, for example, changing from being able to send emails to anyone to being able to send emails to a single email address.

Allow indicates that the AI agent may continue operating in the execution environment without modification.

In step S5, the software 38 executed by the processor 16 causes the electronic device 10 to compare the integrity score against a threshold value. Next, in step S6, the software 38 executed by the processor 16 causes the electronic device 10 to determine whether the integrity score satisfies the threshold value. If not, in step S7, the software 38 executed by the processor 16 causes the electronic device 10 to modify the capabilities of the AI agent. Modifying capabilities of the AI agent includes, for example, substituting a record Persona Snapshot of the person for a Baseline Persona Model associated with the person, reducing the TTL of a named capability and switching a capability-specific credential with a down-scoped purpose-bound token, and limiting capabilities of the AI agent. The TTL may be reduced by a factor α of, for example, 0.5. The factor α may be different based on the difference between the integrity score and the threshold value. For example, when the difference is small the factor α may be, for example, 0.1. However, when the difference is large the factor α may be, for example, 0.9.

Examples of limiting the capabilities of the AI agent include, but are not limited to, reducing the sensitivity of data the AI agent is permitted to access, reducing the write-effect scope of the AI agent, and reducing the data allowed to be transmitted by the agent from the electronic device 10 via the network 14. Any combination of the example modifications may be implemented by the electronic device 10, including implementing a sole modification.

However, when the integrity score satisfies the threshold value, in step S8, the software 38 executed by the processor 16 causes the electronic device 10 to determine whether the decision outcome is deny or allow with modifications. If the decision outcome is neither deny nor allow with modifications, in step S1, the software 38 executed by the processor 16 causes the electronic device 10 to capture execution signals generated by the artificial intelligence (AI) agent. However, if the decision outcome is deny or allow with modifications, in step S9, the software 38 executed by the processor 16 causes the electronic device 10 to determine whether the decision outcome is allow with modification. When the decision outcome is not allow with modifications, in step S10, the software 38 executed by the processor 16 causes the electronic device 10 to prohibit the AI agent from operating in the execution environment. The decision outcome is deny when it is not allow with modifications.

When the decision outcome is allow with modifications, in step S7, the software 38 executed by the processor 16 causes the electronic device 10 to modify the capabilities of the AI agent. Modifying capabilities of the AI agent includes, for example, substituting a record Persona Snapshot of the person for a Baseline Persona Model associated with the person, reducing the TTL of a named capability and switching a capability-specific credential with a down-scoped purpose-bound token, and limiting capabilities of the AI agent. Examples of limiting the capabilities of the AI agent include, but are not limited to, reducing the sensitivity of data the AI agent is permitted to access, reducing the write-effect scope of the AI agent, and reducing the data allowed to be transmitted by the agent from the electronic device 10 via the network 14. Any combination of the example modifications may be implemented by the electronic device 10, including implementing a sole modification.

The threshold value as described herein may initialize from statistically defined bands, for example, $k\sigma$ standard deviations ($\mu\pm k\sigma$) from the mean similarity score, where $\mu$ is the mean similarity score, $\sigma$ is an exponentially weighted moving standard deviation of recent deviations, and k is at least equal to zero and is policy configurable. $k\sigma$ is the standard deviation. Thus, the threshold value may be adjusted by plus or minus $k\sigma$. The quantity $k\sigma$ may be a measure of an amount of drift permitted in the behavior of the AI agent before the capabilities of the agent are modified.

The integrity score fails to satisfy the threshold value when the integrity score falls outside the range of ($\mu\pm k\sigma$) from the mean similarity score. Not satisfying the threshold value indicates that the execution signals of the AI agent deviate by an unacceptable amount from the threshold value. As a result, the capabilities of the agent are modified. Changes in behavioral characteristics of an AI agent, for example, the AI agent 46 which evolve over time are known as behavioral drift. Using a range as a threshold facilitates detecting changes, or drift, in the behavior of the AI agent.

Although the example method and algorithm described herein compares the integrity score against the threshold value, it is contemplated by the present disclosure that the AI agent similarity score may alternatively be compared against an agent similarity threshold value to determine whether changes in the behavior of the AI agent are within an acceptable range. It is contemplated by the present disclosure that when the AI agent similarity score is compared against the agent similarity threshold value, the integrity score is not compared against the threshold value.

The AI agent similarity score can fail to satisfy the agent similarity threshold value, for example, when the AI agent similarity score falls outside the range of ($\mu\pm k\sigma$) from the mean similarity score where $\mu$ is the mean similarity score, $\sigma$ is an exponentially weighted moving standard deviation of recent deviations, and k is at least equal to zero and is policy configurable. $k\sigma$ is the standard deviation. Thus, the agent similarity threshold value may be adjusted by plus or minus $k\sigma$.

Not satisfying the agent similarity threshold value indicates that the execution signals of the AI agent deviate by an unacceptable amount from the agent similarity threshold value. As a result, the capabilities of the agent are modified. Using a range as a threshold facilitates detecting changes, or drift, in the behavior of the AI agent.

Although the example method and algorithm described herein modifies the capabilities of the AI agent when the integrity score fails to satisfy the threshold score or when the decision outcome is allow with modifications, it is contemplated by the present disclosure that the capabilities of the AI agent may be restored when the AI agent similarity score satisfies the agent similarity threshold value and the integrity score satisfies the threshold value for a certain number of time intervals. Restoring the AI agent may also require completing supervised refinement of the AI agent using the Persona Snapshot of the person bound to the AI agent. Additionally, a step-up re-authentication of the person may be required. A reconciliation entry regarding restoration of the AI agent may be written to the Immutable ledger.

It is contemplated by the present disclosure that a verifiable audit proof may be generated that includes items of data, for example, signed snapshot identifiers, policy-decision hashes, attestation records, TTL change events, rollback transactions, sandbox technique implementations. Each item of data may be referenced by ledger transaction identifiers. The items of data may be combined, for example, as a Merkle root that is HSM-signed and recorded to the Immutable ledger for regulator-grade provenance.

Using the methods and algorithms for maintaining behavioral integrity of autonomous AI agents as described herein enables detecting behavioral drift and compromise from the execution signals of the AI Agent, enforcing environment integrity via attestation, reducing the scope of possible damage from a successful attack by reducing the time-to live and purpose-bound token down-scoping, containing risk in sandboxed tiers and restoring capabilities and, where applicable, supervised refinement, and providing verifiable audit proofs linking every decision to HSM-signed artifacts on an Immutable Ledger for regulator-grade auditability. As a result, the integrity gap is facilitated to be closed during autonomous AI operation while preserving terminology, lineage, and cryptographic anchors. As a result, AI agents are facilitated to be deployed for important operations with confidence in ongoing identity binding and trustworthiness transactions.

It is contemplated by the present disclosure that the example methods and algorithms described herein may be conducted entirely by the electronic device 10, partly by the electronic device 10 and partly by the server 12, entirely by the server 12, or by any other combination of other servers (not shown), electronic devices (not shown), or computers (not shown) operable to communicate with the electronic device 10 via the network 14. Furthermore, data described herein as being stored in the electronic device 10 may alternatively, or additionally, be stored in any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method of maintaining behavioral integrity of an artificial intelligence agent comprising the steps of:
   capturing, by an electronic device, artificial intelligence agent execution signals, wherein the artificial intelligence agent is bound to a person;
   calculating similarity scores from the execution signals;
   calculating an agent similarity score from the similarity scores;
   verifying runtime attestation of an execution environment hosting the artificial intelligence agent;

calculating an attestation conformity score from the runtime attestation;
   calculating an integrity score by combining the agent similarity and attestation conformity scores;
   evaluating policy-as-code at one or more policy checkpoints to generate a decision outcome based on a cryptographic hash of a canonical decision object, wherein the policy checkpoints include discover, invoke, and runtime;
   comparing the integrity score against a threshold value; and
   in response to determining the integrity score failed to satisfy the threshold value or the decision outcome indicates allow with modification, modifying capabilities of the artificial intelligence agent.

2. The method according to claim 1, wherein the agent execution signals include at least one of a tool-invocation graph, inter-call timing statistics, resource-scope descriptors of accessed data or services, and output-plan embeddings.

3. The method according to claim 1, said calculating an integrity score step further comprising combining the agent similarity score, the attestation conformity score, and modality specific similarity scores of a Baseline Persona Model of the person, the Baseline Persona Model being a machine learning model that encodes the behavioral modality data of the person over time.

4. The method according to claim 1, wherein the decision outcome comprises:
   allowing the artificial intelligence agent to continue operating in the execution environment;
   modifying capabilities of the artificial intelligence agent and allowing the artificial intelligence agent to continue operating in the execution environment in accordance with the modifications; or
   prohibiting the artificial intelligence agent from operating in the execution environment.

5. The method according to claim 1, wherein the runtime attestation comprises at least one of:
   a trusted execution environment quote or measurement;
   a container image hash;
   a software bill of materials artifact; and
   a model-weights hash.

6. The method according to claim 1, for each policy checkpoint, said method further comprising:
   generating the canonical decision object, wherein the canonical decision object includes at least an agent identification, an identification of the person, an authorized capability of the artificial intelligence agent, a purpose of the artificial intelligence agent, a data class, the agent similarity score, human-modality similarity scores, the attestation conformity score, the integrity score, the threshold value, a time-to-live before the artificial intelligence agent is compromised, a time-to-live after determining the artificial intelligence agent may be compromised, a time-to-live after determining the artificial intelligence agent is compromised, a timestamp, and a nonce;
   computing a hash of the canonical decision object;
   signing the hash within a Hardware Security Module; and
   writing the signed hash with metadata to an Immutable Ledger.

7. The method according to claim 1, further comprising generating a verifiable audit proof for a time interval, the audit proof including entries, the entries comprising a signed snapshot identifier, hashes of policy decisions, attestation records, time-to-live change events, and identifiers of roll-back or sandbox transactions recorded on an Immutable Ledger.

8. The method according to claim 1, said modifying capabilities of the artificial intelligence agent step comprises at least one of:

substituting a record Persona Snapshot of the person for a Baseline Persona Model associated with the person;

reducing a time-to-live for a specific capability of the artificial intelligence agent and replacing a capability-specific credential with a down-scoped, purpose-bound token having capabilities less than the specific capability; and routing actions of the artificial intelligence agent to limit at least one of data accessible by the agent, the scope of write operations of the agent, and transmissions of data by the agent from the electronic device via a network.

9. The method according to claim 8, further comprising:

after said routing step, comparing the integrity score against the threshold value; and when the integrity score satisfies the threshold value, expanding a down-scoped capability and appending a reconciliation entry to an Immutable Ledger.

10. The method according to claim 1, wherein the similarity scores include a Tool-Invocation Graph similarity score, an Inter-Call Timing similarity score, a Resource-Scope Descriptor similarity score, and an Output-Plan Embedding similarity score, said calculating the agent similarity score step comprising combining the similarity scores.

11. An electronic device for maintaining behavioral integrity of an artificial intelligence agent comprising:

a processor; and a memory configured to store data, said electronic device being associated with a network and said memory being in communication with said processor and having instructions stored thereon which, when read and executed by said processor, cause said electronic device to:

capture artificial intelligence agent-native execution signals, wherein the artificial intelligence agent is bound to a person;

calculate similarity scores from the execution signals;

calculate an agent similarity score from the similarity scores;

verify runtime attestation of an execution environment hosting the artificial intelligence agent;

calculate an attestation conformity score from the runtime attestation;

calculate an integrity score by combining the agent similarity and attestation conformity scores;

evaluate policy-as-code at one or more policy checkpoints to generate a decision outcome based on a cryptographic hash of a canonical decision object, wherein the policy checkpoints include discover, invoke, and runtime;

compare the integrity score against a threshold value; and in response to determining the integrity score failed to satisfy the threshold value or the decision outcome indicates allow with modification, modify capabilities of the artificial intelligence agent.

12. The electronic device according to claim 11, wherein the agent execution signals include at least one of a tool-invocation graph, inter-call timing statistics, resource-scope descriptors of accessed data or services, and output-plan embeddings.

13. The electronic device according to claim 11, wherein the instructions when read and executed by said processor, further cause said electronic device to combine the agent similarity score, the attestation conformity score, and modality specific similarity scores of a Baseline Persona Model of the person to calculate the integrity score, the Baseline Persona Model being a machine learning model that encodes the behavioral modality data of the person over time.

14. The electronic device according to claim 11, wherein the decision outcome is allow, allow with modifications, or deny, wherein:

allow permits the artificial intelligence agent to continue operating in the execution environment;

allow with modification modifies capabilities of the artificial intelligence agent and allows the artificial intelligence agent to continue operating in the execution environment in accordance with the modifications; and deny prohibits the artificial intelligence agent from operating in the execution environment.

15. The electronic device according to claim 11, wherein the runtime attestation comprises at least one of:

a trusted execution environment quote or measurement;

a container image hash;

a software bill of materials artifact; and a model-weights hash.

16. The electronic device according to claim 11, wherein the instructions when read and executed by said processor, further cause said electronic device to:

generate the canonical decision object, wherein the canonical decision object includes at least an agent identification, an identification of the person, an authorized capability of the artificial intelligence agent, a purpose of the artificial intelligence agent, a data class, the agent similarity score, human-modality similarity scores, the attestation conformity score, the integrity score, the threshold value, a time-to-live before the artificial intelligence agent is compromised, a time-to-live after determining the artificial intelligence agent may be compromised, a time-to-live after determining the artificial intelligence agent is compromised, a timestamp, and a nonce;

compute a hash of the canonical decision object;

sign the hash within a Hardware Security Module; and write the signed hash with metadata to an Immutable Ledger.

17. The electronic device according to claim 11, wherein the instructions when read and executed by said processor, further cause said electronic device to generate a verifiable audit proof for a time interval, the audit proof including entries, the entries comprising a signed snapshot identifier, hashes of policy decisions, attestation records, time-to-live lease change events, and identifiers of rollback or sandbox transactions recorded on an immutable ledger.

18. The electronic device according to claim 11, wherein the instructions when read and executed by said processor, further cause said electronic device to modify capabilities of the artificial intelligence agent by conducting at least one of the following:

substituting a record Persona Snapshot of the person for a Baseline Persona Model associated with the person;

reducing a time-to-live for a specific capability of the artificial intelligence agent and replacing a capability-specific credential with a down-scoped, purpose-bound token having capabilities less than the specific capability; and routing actions of the artificial intelligence agent to limit at least one of data accessible by the agent, the scope of write operations of the agent, and transmissions of data by the agent from the electronic device via a network.

19. The electronic device according to claim 18, wherein the instructions when read and executed by said processor, further cause said electronic device to:

compare the integrity score against the threshold value after the actions of the artificial intelligence agent are routed to a sandboxed execution tier; and when the integrity score satisfies the threshold value, expand a down-scoped capability and append a reconciliation entry to an Immutable Ledger.

20. A non-transitory computer-readable recording medium in an electronic device for maintaining behavioral integrity of an artificial intelligence agent, the non-transitory computer-readable recording medium storing instructions which when executed by a hardware processor cause the hardware processor to perform steps comprising:

capturing artificial intelligence agent execution signals, wherein the artificial intelligence agent is bound to a person;

calculating similarity scores from the execution signals;

calculating an agent similarity score from the similarity scores;

verifying runtime attestation of an execution environment hosting the artificial intelligence agent;

calculating an attestation conformity score from the runtime attestation;

calculating an integrity score by combining the agent similarity and attestation conformity scores;

evaluating policy-as-code at one or more policy checkpoints to generate a decision outcome based on a cryptographic hash of a canonical decision object, wherein the policy checkpoints include discover, invoke, and runtime;

comparing the integrity score against a threshold value; and in response to determining the integrity score failed to satisfy the threshold value or the decision outcome indicates allow with modification, modifying capabilities of the artificial intelligence agent.

* * * * *